(12) United States Patent
Miller et al.

(10) Patent No.: US 9,994,172 B2
(45) Date of Patent: Jun. 12, 2018

(54) METHODS AND SYSTEMS TO DETERMINE AND COMMUNICATE DRIVER PERFORMANCE

(71) Applicant: Ford Global Technologies, LLC, Dearborn, MI (US)

(72) Inventors: Kenneth James Miller, Canton, MI (US); Douglas Raymond Martin, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 438 days.

(21) Appl. No.: 14/632,040

(22) Filed: Feb. 26, 2015

(65) Prior Publication Data

US 2016/0250983 A1 Sep. 1, 2016

(51) Int. Cl.
*B60Q 1/00* (2006.01)
*B60R 16/023* (2006.01)

(52) U.S. Cl.
CPC ........... *B60R 16/0236* (2013.01); *Y02T 10/84* (2013.01)

(58) Field of Classification Search
CPC .......... G08G 1/00; G08G 1/01; G08G 1/0112; G08G 1/0137; G08G 1/0141; G08G 1/16; B60W 40/09; G06Q 50/30; G06Q 40/08
See application file for complete search history.

(56) References Cited

U.S. PATENT DOCUMENTS

| | | | | |
|---|---|---|---|---|
| 5,699,056 A | * | 12/1997 | Yoshida | G01C 21/26 340/905 |
| 7,389,178 B2 | * | 6/2008 | Raz | G07C 5/085 340/903 |
| 8,478,499 B2 | * | 7/2013 | Rupp | G08G 1/0112 180/170 |
| 8,653,986 B2 | | 2/2014 | Tamir et al. | |
| 8,825,356 B2 | * | 9/2014 | Vorona | G08G 1/0104 701/119 |
| 9,633,568 B2 | * | 4/2017 | Mohn | G09B 5/00 |
| 2007/0027593 A1 | * | 2/2007 | Shah | B60W 50/00 701/29.4 |
| 2012/0065834 A1 | | 3/2012 | Senart et al. | |
| 2012/0283893 A1 | | 11/2012 | Lee et al. | |
| 2013/0052614 A1 | | 2/2013 | Mollicone et al. | |
| 2014/0039749 A1 | | 2/2014 | Jelbert et al. | |
| 2014/0052672 A1 | * | 2/2014 | Wagner | G06Q 10/06398 705/500 |
| 2014/0244150 A1 | * | 8/2014 | Boesch | G06F 17/00 701/123 |

(Continued)

FOREIGN PATENT DOCUMENTS

DE 102005025271 A1 9/2006

*Primary Examiner* — Ryan Sherwin
(74) *Attorney, Agent, or Firm* — Frank MacKenzie; Brooks Kushman P.C.

(57) ABSTRACT

A method of rating driver effectiveness based on vehicle data compared to other vehicles that have driven over the same road segment includes storing driving speed data over a road segment for a plurality of vehicles. The method further includes calculating a nominal speed profile for the road segment based on the driving speed data. The method further includes comparing a speed profile of a subject vehicle to the nominal speed profile for the road segment and displaying a smoothness rating of the subject vehicle based on deviation of the speed profile from the nominal speed profile.

20 Claims, 7 Drawing Sheets

(56) References Cited

U.S. PATENT DOCUMENTS

| | | | |
|---|---|---|---|
| 2014/0278574 A1* | 9/2014 | Barber | B60W 40/09 705/4 |
| 2015/0112546 A1* | 4/2015 | Ochsendorf | B60W 50/14 701/33.4 |

\* cited by examiner

METHODS AND SYSTEMS TO DETERMINE AND COMMUNICATE DRIVER PERFORMANCE

TECHNICAL FIELD

The present disclosure relates to a method and system for analyzing the performance of a driver of a vehicle and producing a driver rating for the driver.

BACKGROUND

Modern vehicles are typically equipped with a variety of onboard sensors and computers for measuring and recording vehicle performance, diagnostic, and location data. These devices provide a great deal of information about the performance of the vehicle during operation. Systems have been proposed to communicate driving performance such as fuel efficiency based on the use of the data generated from the onboard sensors and computers. Different drivers have different driving styles, and the driving styles may affect the performance for operating the vehicle. For example, an aggressive driver may accelerate more quickly than a less aggressive driver, and may brake harder and faster than a less aggressive driver. A gentler, efficiency-minded or eco-friendly driver may accelerate more slowly or softly than an aggressive driver, and may brake more gently or gradually.

A driver's performance may be compared to an expected, nominal, or target performance for a particular road segment. However a number of road/driving conditions may impact the target or desired performance, such as time of day, weather and visibility, traffic volume, type of road, etc. Therefore, it is difficult to determine an expected or ideal driving behavior or performance for comparison under similar conditions for all possible locations and road segments.

SUMMARY

In at least one embodiment, a vehicle includes a display for communicating information to a driver and a computer programmed to calculate a smoothness rating. The computer may be further programmed to store vehicle speed data in a memory, to generate a speed profile of the vehicle associated with a road segment, to generate a smoothness rating of the vehicle based on a comparison between the speed profile and a nominal velocity profile of a plurality of vehicles that have driven on the road segment, and to output the smoothness rating at the display.

In at least one embodiment, a method of rating driver effectiveness based on vehicle data compared to other vehicles that have driven over the same road segment includes storing driving speed data over a predetermined road segment for a plurality of vehicles. The method may further include calculating a nominal speed profile for the predetermined road segment based on the driving speed data and comparing a speed profile of a subject vehicle to the nominal speed profile for the predetermined road segment. The method may also include displaying a smoothness rating of the speed profile of the subject vehicle based on deviation from the nominal speed profile.

In at least one embodiment, a driver performance server includes a processor configured to communicate a smoothness rating to a vehicle computing system (VCS). The processor may be programmed to retrieve a road segment based on vehicle data received from the VCS. The vehicle data may include a location and vehicle speed. The processor may be further programmed to calculate a nominal velocity for the road segment based on the vehicle data, to calculate a smoothness rating based on the nominal velocity and the vehicle speed, and to transmit the smoothness rating to the VCS.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

The embodiments of the present disclosure generally provide for a plurality of circuits or other electrical devices. All references to the circuits and other electrical devices and the functionality provided by each, are not intended to be limited to encompassing only what is illustrated and described herein. While particular labels may be assigned to the various circuits or other electrical devices disclosed, such labels are not intended to limit the scope of operation for the circuits and the other electrical devices. Such circuits and other electrical devices may be combined with each other and/or separated in any manner based on the particular type of electrical implementation that is desired. It is recognized that any circuit or other electrical device disclosed herein may include any number of microprocessors, integrated circuits, memory devices (e.g., FLASH, random access memory (RAM), read only memory (ROM), electrically programmable read only memory (EPROM), electrically erasable programmable read only memory (EEPROM), or other suitable variants thereof) and software which co-act with one another to perform operation(s) disclosed herein. In addition, any one or more of the electric devices may be configured to execute a computer-program that is embodied in a non-transitory computer readable medium that is programmed to perform any number of the functions as disclosed.

The disclosure relates to systems and methods for generating a nominal velocity profile for several different road segments based on a population of vehicle velocity data. The systems and methods may receive a velocity profile including other road conditions and/or driving conditions to calculate a nominal profile for each road segment. The systems and methods may provide a vehicle an assigned 'smoothness' score for each road segment based on a deviation from the nominal profile. For example, a vehicle may receive feedback data based on a 'smoothness' performance calculated from a statistical placement within a population of 'smoothness' scores for a given road segment.

The systems and methods may output a feedback performance assessment. The feedback performance assessment may be based on deviations provided at selective timing using a severity of 'smoothness' deviation and other factors. For example, a deviation exceeding a threshold may trigger an immediate warning, while generally 'unsmooth' driving with deviation less than the threshold but greater than another threshold may trigger an end of trip 'smoothness' recommendation. The systems and methods may output a warning for a road segment if necessary, or a message synthesized to an overall recommendation for 'smoothness' performance over the entire trip.

Figure 1:
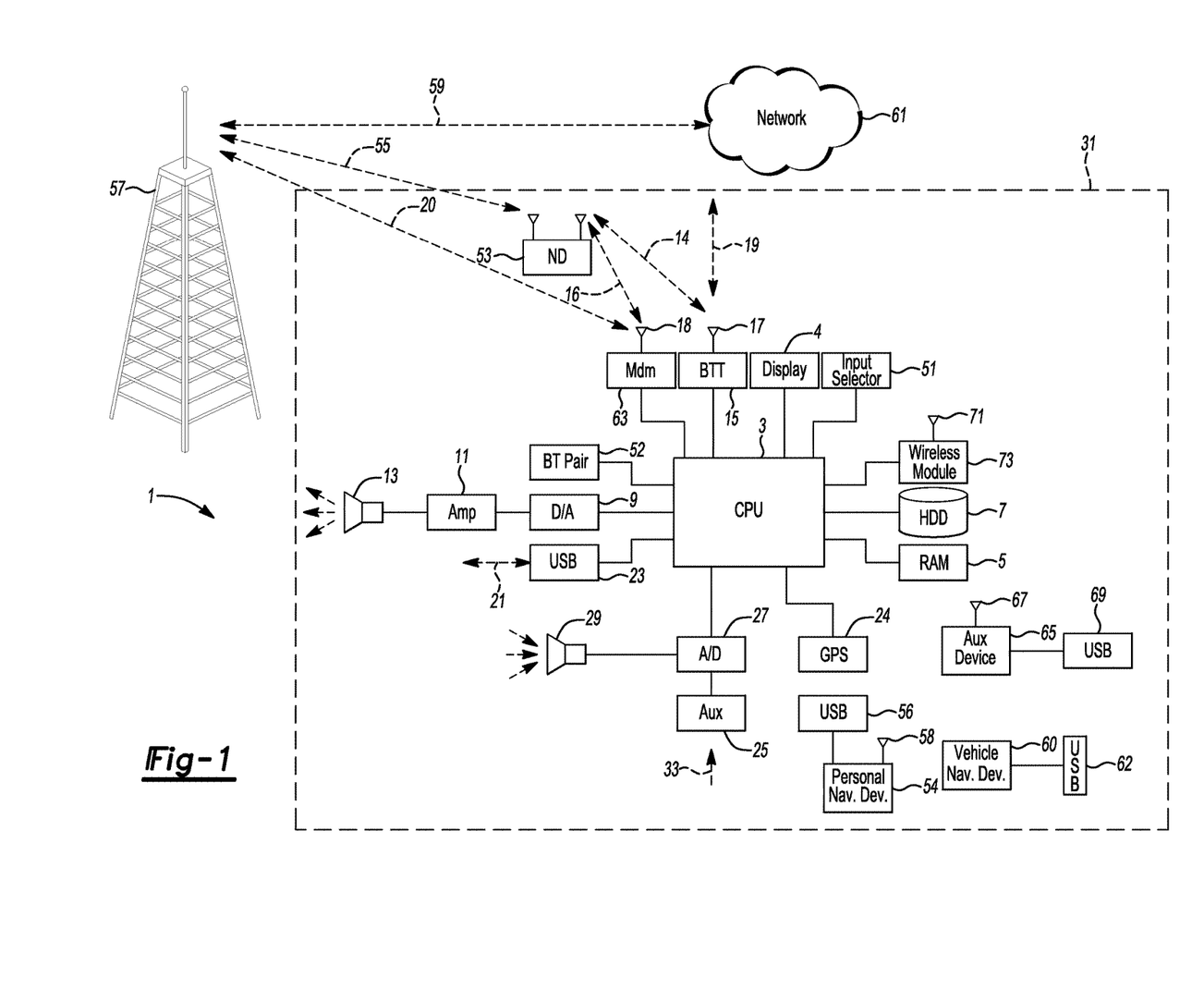
FIG. 1 is an exemplary block topology of a vehicle infotainment system implementing a user-interactive vehicle information display system.

FIG. 1 illustrates an example block topology for a vehicle based computing system 1 (VCS) for a vehicle 31. An example of such a vehicle-based computing system 1 is the SYNC system manufactured by THE FORD MOTOR COMPANY. A vehicle enabled with a vehicle-based computing system may contain a visual front end interface 4 and/or a HUD (not shown) located in the vehicle. The user may also be able to interact with the interface if it is provided, for example, with a touch sensitive screen. In another illustrative embodiment, the interaction occurs through button presses, and/or a spoken dialog system with automatic speech recognition and speech synthesis.

In the illustrative embodiment shown in FIG. 1, a processor 3 controls at least some portion of the operation of the vehicle-based computing system. Provided within the vehicle, the processor allows onboard processing of commands and routines. Further, the processor is connected to both non-persistent 5 and persistent storage 7. In this illustrative embodiment, the non-persistent storage is random access memory (RAM) and the persistent storage is a hard disk drive (HDD) or flash memory. In general, persistent (non-transitory) memory can include all forms of memory that maintain data when a computer or other device is powered down. These include, but are not limited to, HDDs, CDs, DVDs, magnetic tapes, solid state drives, portable USB drives and any other suitable form of persistent memory.

The processor is also provided with a number of different inputs allowing the user to interface with the processor. In this illustrative embodiment, a microphone 29, an auxiliary input 25 (for input 33), a USB input 23, a GPS input 24, screen 4, which may be a touchscreen display, and a BLUETOOTH input 15 are all provided. An input selector 51 is also provided, to allow a user to swap between various inputs. Input to both the microphone and the auxiliary connector is converted from analog to digital by a converter 27 before being passed to the processor. Although not shown, numerous of the vehicle components and auxiliary components in communication with the VCS may use a vehicle network (such as, but not limited to, a CAN bus) to pass data to and from the VCS (or components thereof).

Outputs to the system may include, but are not limited to, the visual display 4, the HUD, and a speaker 13 or stereo system output. The speaker 13 is connected to an amplifier 11 and receives its signal from the processor 3 through a digital-to-analog converter 9. Output can also be made to a remote BLUETOOTH device such as PND 54 or a USB device such as vehicle navigation device 60 along the bi-directional data streams shown at 19 and 21 respectively.

In one illustrative embodiment, the system 1 uses the BLUETOOTH transceiver 15 to communicate 17 with a user's nomadic device 53 (e.g., cell phone, smart phone, PDA, or any other handheld device having wireless remote network connectivity). The handheld device 53 can then be used to communicate 59 with a network 61 outside the vehicle 31 through, for example, communication 55 with a cellular tower 57. In some embodiments, tower 57 may be a WiFi access point.

Exemplary communication between the handheld device 53 and the BLUETOOTH transceiver is represented by signal 14.

Pairing a handheld device 53 and the BLUETOOTH transceiver 15 can be instructed through a button 52 or similar input. Accordingly, the CPU is instructed that the onboard BLUETOOTH transceiver will be paired with a BLUETOOTH transceiver in a handheld device.

Data may be communicated between CPU 3 and network 61 utilizing, for example, a data-plan, data over voice, or DTMF tones associated with nomadic device 53. Alternatively, it may be desirable to include an onboard modem 63 having antenna 18 in order to communicate 16 data between CPU 3 and network 61 over the voice band. The handheld device 53 can then be used to communicate 59 with a network 61 outside the vehicle 31 through, for example, communication 55 with a cellular tower 57. In some embodiments, the modem 63 may establish communication 20 with the tower 57 for communicating with network 61. As a non-limiting example, modem 63 may be a USB cellular modem and communication 20 may be cellular communication.

In one illustrative embodiment, the processor is provided with an operating system including an API to communicate with modem application software. The modem application software may access an embedded module or firmware on the BLUETOOTH transceiver to complete wireless communication with a remote BLUETOOTH transceiver (such as that found in a nomadic device). Bluetooth is a subset of the IEEE 802 PAN (personal area network) protocols. IEEE 802 LAN (local area network) protocols include WiFi and have considerable cross-functionality with IEEE 802 PAN. Both are suitable for wireless communication within a vehicle. Another communication means that can be used in this realm is free-space optical communication (such as IrDA) and non-standardized consumer IR protocols.

In another embodiment, the handheld device 53 includes a modem for voice band or broadband data communication. In the data-over-voice embodiment, a technique known as frequency division multiplexing may be implemented when the owner of the handheld device can talk over the device while data is being transferred. At other times, when the owner is not using the device, the data transfer can use the whole bandwidth (300 Hz to 3.4 kHz in one example). While frequency division multiplexing may be common for analog cellular communication between the vehicle and the internet, and is still used, it has been largely replaced by hybrids of Code Domain Multiple Access (CDMA), Time Domain Multiple Access (TDMA), and Space-Domain Multiple Access (SDMA) for digital cellular communication. These are all ITU IMT-2000 (3G) compliant standards and offer data rates up to 2 mbs for stationary or walking users and 385 kbs for users in a moving vehicle. 3G standards are now being replaced by IMT-Advanced (4G) which offers 100 mbs for users in a vehicle and 1 gbs for stationary users. If the user has a data-plan associated with the nomadic device, it is possible that the data-plan allows for broad-band transmission and the system could use a much wider bandwidth (speeding up data transfer). In still another embodiment, handheld device 53 is replaced with a cellular communication device (not shown) that is installed to vehicle 31. In yet another embodiment, the handheld device 53 may be a wireless local area network (LAN) device capable of communication over, for example (and without limitation), an 802.11g network (i.e., WiFi) or a WiMax network.

In one embodiment, incoming data can be passed through the handheld device 53 via a data-over-voice or data-plan, through the onboard BLUETOOTH transceiver and into the vehicle's internal processor 3. In the case of certain temporary data, for example, the data can be stored on the HDD or other storage media 7 until such time as the data is no longer needed.

Additional sources that may interface with the vehicle include a personal navigation device 54, having, for example, a USB connection 56 and/or an antenna 58, a vehicle navigation device 60 having a USB 62 or other connection, an onboard GPS device 24, or remote navigation system (not shown) having connectivity to network 61. USB is one of a class of serial networking protocols. IEEE 1394 (FireWire™ (Apple), i.LINK™ (Sony), and Lynx™ (Texas Instruments)), EIA (Electronics Industry Association) serial protocols, IEEE 1284 (Centronics Port), S/PDIF (Sony/Philips Digital Interconnect Format) and USB-IF (USB Implementers Forum) form the backbone of the device-device serial standards. Most of the protocols can be implemented for either electrical or optical communication. The system 1 may communicate the data received from the handheld device and/or the additional sources to one or more outputs. The one or more outputs may include, but is not limited to, the display 4, speaker 29, HUD (not shown), and/or a combination thereof.

Further, the CPU could be in communication with a variety of other auxiliary devices 65. These devices can be connected through a wireless 67 or wired 69 connections. Auxiliary device 65 may include, but are not limited to, personal media players, wireless health devices, portable computers, and the like.

Also, or alternatively, the CPU could be connected to a vehicle based wireless router 73, using for example a WiFi (IEEE 803.11) 71 transceiver. This could allow the CPU to connect to remote networks in range of the local router 73.

In addition to having exemplary processes executed by a vehicle computing system located in a vehicle, in certain embodiments, the exemplary processes may be executed by a computing system in communication with a vehicle computing system. Such a system may include, but is not limited to, the handheld device (e.g., and without limitation, a mobile phone) or a remote computing system (e.g., and without limitation, a server) connected through the handheld device. Collectively, such systems may be referred to as vehicle associated computing systems (VACS). In certain embodiments particular components of the VACS may perform particular portions of a process depending on the particular implementation of the system. By way of example and not limitation, if a process has a step of sending or receiving information with a paired handheld device, then it is likely that the handheld device is not performing the process, since the handheld device would not "send and receive" information with itself. One of ordinary skill in the art will understand when it is inappropriate to apply a particular VACS to a given solution. In all solutions, it is contemplated that at least the vehicle computing system (VCS) located within the vehicle itself is capable of performing the exemplary processes.

Figure 2:
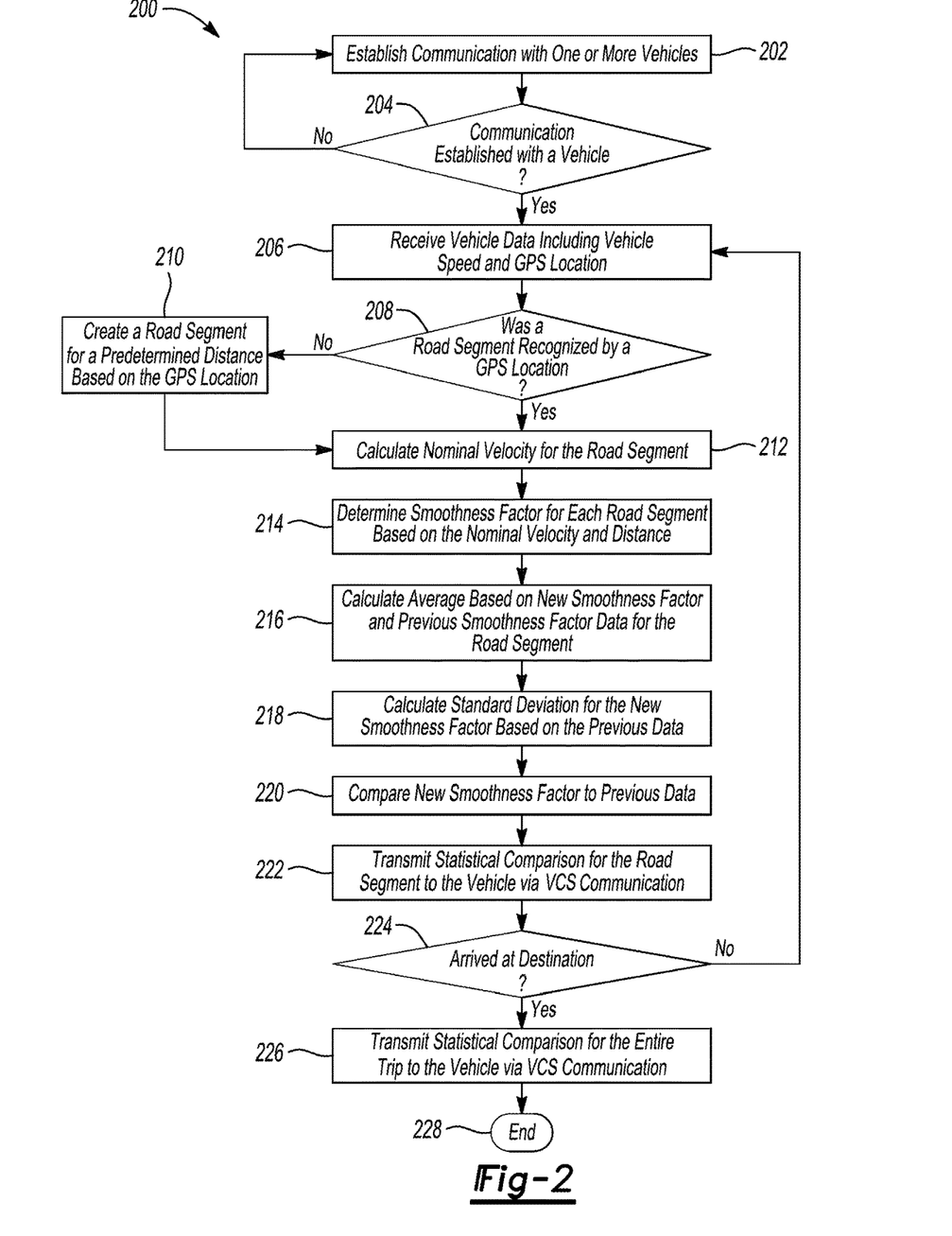
FIG. 2 is an exemplary process for calculating a smoothness factor for a road segment.

FIG. 2 is an exemplary method 200 for calculating a smoothness factor for a road segment at the network 61. The method 200 may be implemented using software code contained at the network 61 (e.g., a server 61) and executed on a system including one or more processors at the server 61, at the VCS 1 in communication with the server 61, at a processor in communication with the server 61, and/or a combination thereof. In other embodiments, the method 200 may be implemented in other vehicle processors, or distributed among multiple processors in communication with the server 61.

Referring again to FIG. 2, the vehicle 31 and its components illustrated in FIG. 1 are referenced throughout the description of the method 200 to facilitate understanding of various aspects of the present disclosure. The method 200 of calculating a nominal velocity profile for several different road segments and outputting a driver performance score (i.e., feedback performance assessment) based on a drive event compared to the road segment profile may be implemented through a computer algorithm, machine executable code, or software instructions programmed into a suitable programmable logic device(s) at the server 61, such as the processor, a nomadic device 53 control module in communication with the server 61, the VCS 1 in communication with the server 61, or a combination thereof. Although the various operations shown in the flowchart diagram 200 appear to occur in a chronological sequence, at least some of the operations may occur in a different order, and some operations may be performed concurrently or not at all.

In operation 202, the system may search for a communication link with a VCS of one or more vehicles. The system may establish communication with a vehicle based on a recognized VCS 1 in operation 204. The system may recognize the VCS 1 based on a security credential received from the VCS 1.

For example, the system may include a server interface made available to other applications of the VCS 1 through an application programming interface (API). The server interface may enable other VCS applications that are receiving data related to the driving conditions and/or road conditions to communicate the data to the server 61. In an example, the API may be registered with a vehicle smoothness service configured to define access to the one or more processors of the server 61 as well as associated supported functions. If an application of the vehicle would like to communicate with the server 61, the application may request to do so using the exposed API. The API may accordingly act as a broker to translate and perform the request of the calling application, including recorded data, weather conditions, road conditions, or received information from other processors in communication with the VCS 1.

In another example, the VCS 1 may be configured to communicate vehicle information based on the road segment to the server 61. The server 61 may receive the information from the VCS 1 and calculate one or more driving behavior variables for a road segment. The VCS 1 may communicate vehicle information to the server via the API of the system.

In operation 206, the system may receive vehicle data including vehicle speed via a speedometer or equivalent sensors and global position system (GPS) location data. The system may determine whether a road segment is recognized based on the location data. For example, the system may recognize the road segment based on a predefined distance of the vehicle location as shown in FIG. 3.

Figure 3:
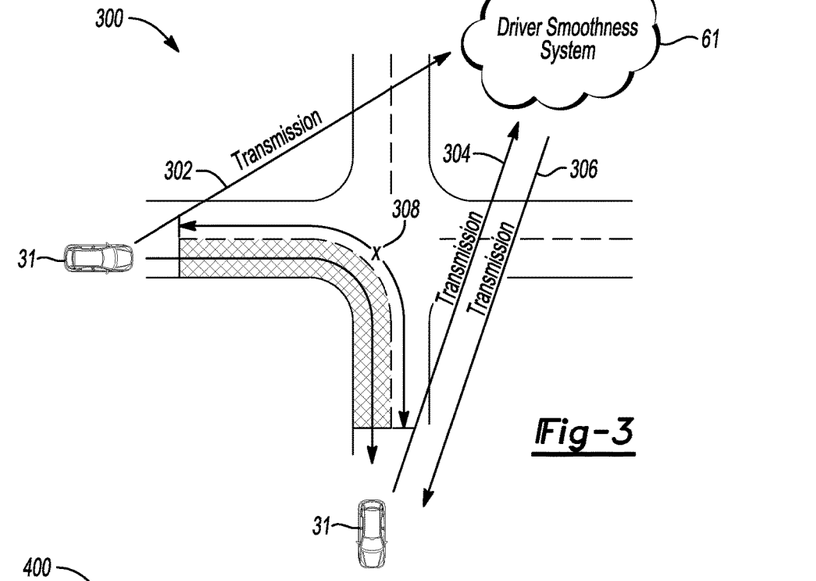
FIG. 3 illustrates an exemplary driving event for a vehicle computing system communicating a driving performance based on the smoothness factor.

FIG. 3 illustrates an exemplary drive event 300 for a VCS 1 communicating a driving performance with a driver smoothness system 61. The driver smoothness system 61 may be in wireless communication with the VCS 1. In one embodiment, the system 61 may be in communication with the VCS 1 via the nomadic device 53.

In response to an established communication link with the VCS 1, the system 61 may receive a first transmission 302 providing vehicle data including, but not limited to, a current GPS location. The system 61 may determine a road segment 308 based on the GPS location. The road segment 308 may be assigned by the system 61 as a turn, a straightaway, a curve, a lane merger, a hill, a paved/unpaved road, a lane transition, a driveway, an entrance, an interstate, a highway, a residential road, an intersection, and/or a combination thereof.

The system 61 may retrieve the recognized road segment 308 from a database (not shown). The system 61 may receive a second transmission 304 from the VCS 1 providing vehicle data for the road segment recognized and just travelled by the vehicle. The system 61 may populate the database with the received vehicle data for the road segment 308. The system 61 may calculate a driver smoothness based on the vehicle data compared to the previous vehicle data traveled on the road segment 308. The VCS 1 may receive a third transmission 306 from the system 61 providing the driver smoothness score for the road segment 308.

As also shown in FIG. 2, in operation 208, the system may determine if a road segment is recognized as a previous road segment stored in the database based on the GPS location. If the road segment is not recognized based on the location, the system 61 may create a road segment for a predefined distance of road based on the GPS location in operation 210.

Figure 4:
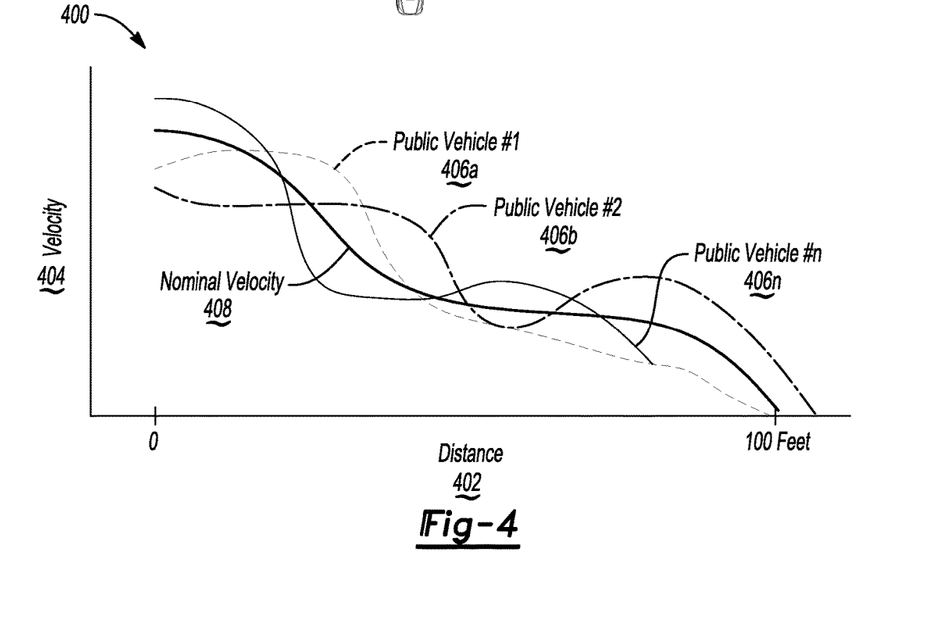
FIG. 4 illustrates an exemplary graph for a nominal velocity of a road segment.

In operation 212, the system may calculate the nominal velocity for the road segment. The nominal velocity is based on the vehicle speed profile traveling across the road segment as shown in FIG. 4. The nominal velocity equation is as follows:

$$\text{Nominal Velocity} = \frac{(PublicVeh1 + PublicVeh2 \ldots + PublicVehn)}{Distance} \quad (1)$$

where $PublicVeh_1 \ldots PublicVeh_n$ represent vehicle speed profiles of different vehicles traveling across the road segment, and the Distance represents the road surface distance of the road segment.

FIG. 4 illustrates an exemplary graph 400 for the nominal velocity of the road segment 308. The graph 400 includes an x-axis 402 depicting distance and a y-axis 404 depicting velocity. The graph 400 tracks one or more public vehicles represented at 406 that have previously driven on the road segment 308. The system may correlate the road segment 308 data based on several factors including, but not limited to, traffic, time of day, weather, month of year, and/or a combination thereof.

In response to the vehicle data related to the road segment received from the VCS 1, the system may generate a velocity for the vehicle 31. Based on the data illustrated on the graph 400, the system may generate the nominal velocity 408 for the road segment 308. The graph 400 provides a visual comparison of the vehicle velocity compared to the one or more public vehicle data points for the road segment 308. For example, the nominal velocity 408 may be generated using data associated with public vehicle number one 406A, public vehicle number two 406B, etc. up to the $n^{th}$ public vehicle 406C data stored in the database. The system may generate a new nominal velocity for the road segment 308 based on the received data from the VCS 1.

Figure 5:
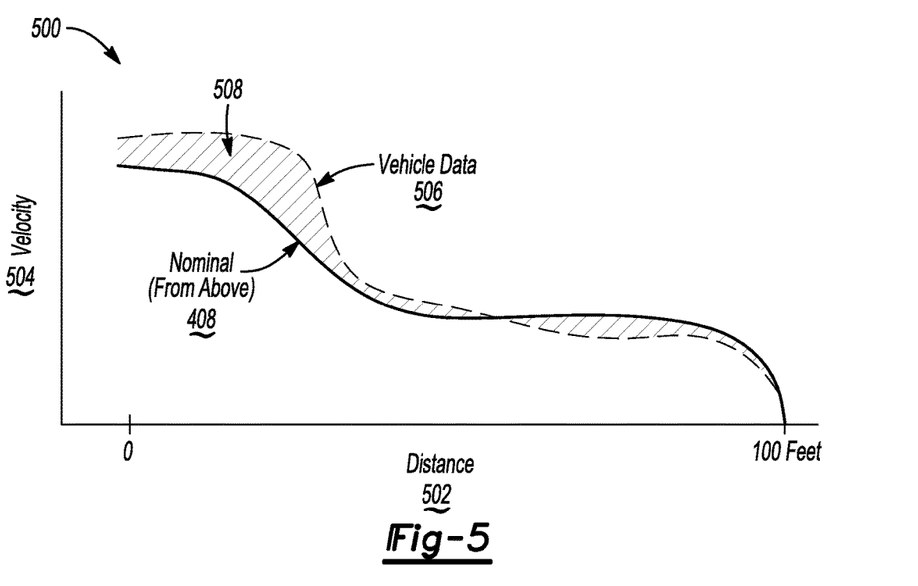
FIG. 5 illustrates an exemplary graph for the smoothness factor based on the nominal velocity.

In operation 214, the system may determine a smoothness factor for the road segment 308 based on the nominal velocity and distance. In one embodiment, the smoothness factor is determined according to:

$$\text{Smoothness Factor} = f(|V_{SPD_{vehicle}} - V_{SPD_{Nominal}}|)/\text{Distance} \quad (2)$$

where $V_{SPD_{vehicle}}$ the calculated velocity for the vehicle 31, $V_{SPD_{Nominal}}$ is the nominal velocity for the road segment based on previous data received from previous vehicle(s) that have traveled on the road segment, and Distance is the total distance of the road segment. The smoothness factor equation is a definite integral for the difference between the vehicle 31 compared to the previous vehicles 406 that have driven the road segment 308. The system may determine the smoothness factor for the vehicle 31 based on the received vehicle data 506 for the road segment 308 as shown in FIG. 5.

FIG. 5 illustrates an exemplary graph 500 for the smoothness factor based on the vehicle 31 data compared to the nominal velocity 408 for the road segment 308. The graph 500 includes an x-axis 502 depicting distance and a y-axis 504 depicting velocity. The system may calculate a vehicle velocity 506 for the vehicle 31 based on the received vehicle data. The graph illustrates the vehicle velocity 506 and the nominal velocity 408 for the road segment 308.

The smoothness factor 508 is the difference between the vehicle velocity 506 received from the vehicle 31 that just traveled over the road segment 308 compared to the nominal velocity 408 for the road segment 308. The smoothness factor 508 is the area under the curve divided by the distance of the road segment 308 as stated in equation (2).

In operation 216, the system may calculate an updated smoothness average based on the recent smoothness factor 508 calculated and the previous smoothness factor data for the road segment 308. For example, the system may calculate a nominal smoothness factor based on the sum of smoothness factor values of public vehicles divided by the number of samples for the road segment 308 as represented by the following:

$$\text{Nominal Smoothness Factor} = \frac{\text{Sum of All Smoothness Factor Values}}{\text{The Total Number of Samples}} \quad (3)$$

In operation 218, the system may calculate an updated standard deviation for the smoothness factor based on the smoothness factor values for the public vehicles. The system may compare the updated smoothness factor to the previous data related to the road segment in operation 220. For example, the system may calculate a smoothness variance based on the following equation:

$$\text{Smoothness Variance} = \frac{(\text{Smoothness Factor} - \text{Nominal Smoothness Factor})}{\text{Standard Deviation Smoothness Factor} - \text{Nominal Smoothness Factor}} \quad (4)$$

The smoothness variance provides a value that compares the vehicle 31 being driven by a user to the nominal and standard deviation for the other vehicles that have been driven on that road segment. The smoothness variance provides a statistical value so that the driver, or other receiving entity, may understand and compare their driving performance to the other drivers who operated a vehicle through that road segment. The system may transmit a statistical comparison for the road segment 308 to the vehicle via a VCS communication link in operation 222. The statistical comparison may provide a visual comparison of a vehicle driver's smoothness factor to a nominal factor for the road segment as shown in FIG. 6.

Figure 6:
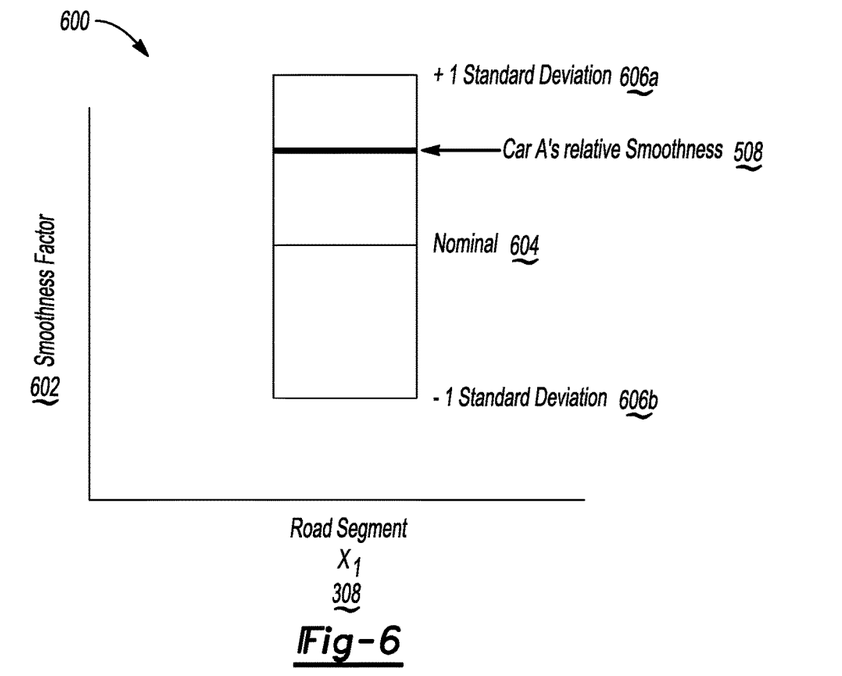
FIG. 6 illustrates an exemplary graph for the smoothness factor of the vehicle compared to other vehicles.

FIG. 6 illustrates an exemplary graph 600 for the smoothness factor 508 of the vehicle compared to other vehicles. The graph 600 includes an x-axis depicting the road segment 308 and a y-axis depicting a road segment smoothness factor 602. The system may output the nominal smoothness factor 604 on the graph 600 as calculated in equation (3). The system may output the calculated standard deviation 606 of the smoothness factor for the road segment. For example, the system may output one standard deviation (606A, 606B) on either side of the nominal smoothness factor 604. The system may output the driver's smoothness factor on the graph 600 for comparison of the driver's performance relative to a range spanning one standard deviation of the nominal smoothness factor 604 for that road segment 308.

In operation 224, the system may verify if the vehicle 31 has arrived at the destination. For example, the system may determine if the vehicle has arrived at its destination based on several factors including, the received vehicle data indicating that the vehicle is in a PARK transmission gear, the received vehicle data indicating destination arrived based on information received at the navigation system, the received vehicle data indicating an ignition off request by the driver, and/or a combination thereof. If the driver has not arrived at the destination based on one or more of the several factors, the system may continue to calculate a smoothness factor in operations 206 through 224. If the driver has arrived at the destination, the system may begin to build the driver's performance for the trip by combining the road segment(s) 308 traveled as shown in FIG. 7.

Figure 7:
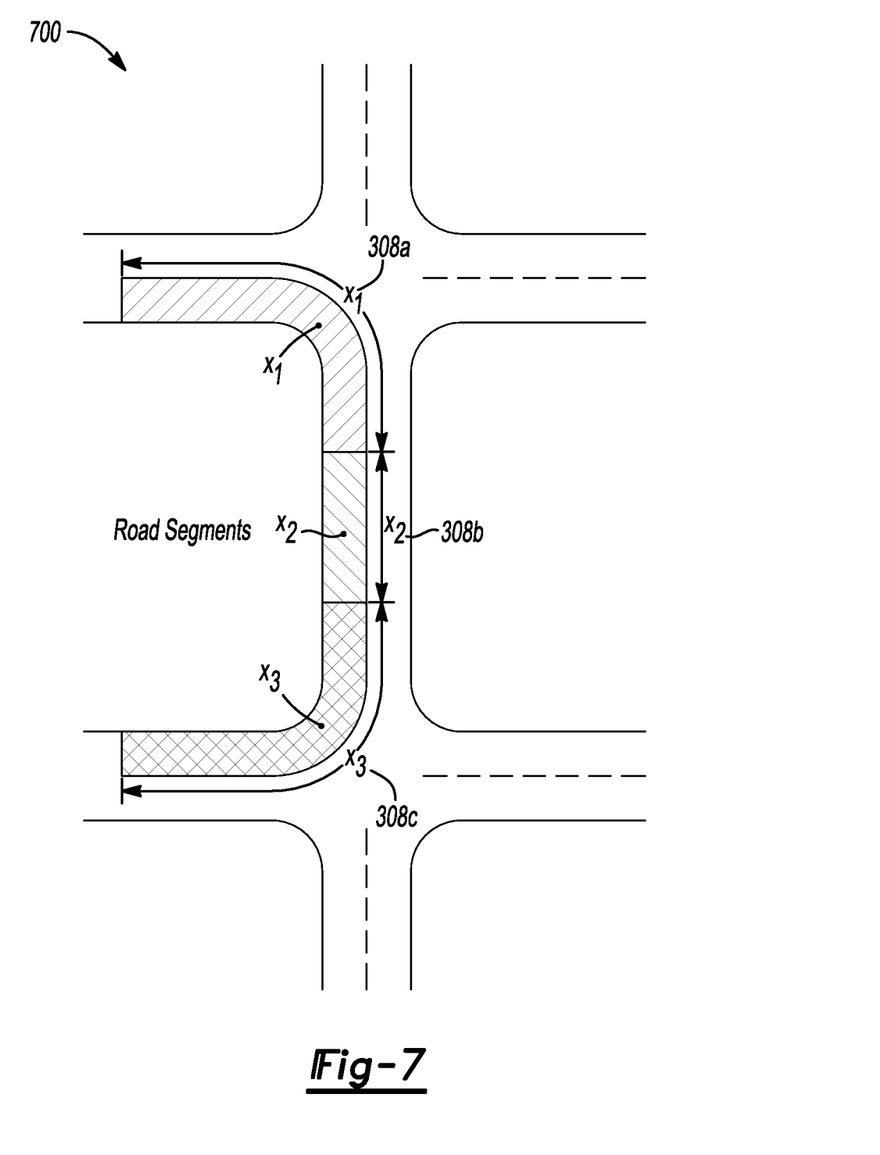
FIG. 7 illustrates an exemplary driving event for a vehicle computing system communicating a trip performance based on the smoothness factor.

FIG. 7 illustrates an exemplary driving event 700 for the VCS 1 communicating a trip performance based on the road segment(s) 308 traveled. The driver smoothness system may combine all the road segments 308 for the trip based on the GPS location. For example, the system may recognize and combine road segments 308a, 308b, and 308c as the trip based on GPS data. In another example, the system may combine the driver's trip based on the navigation system in communication with the system via the VCS 1. The trip may be defined by tracking the vehicle location for a key cycle event (such as ignition key-on to an ignition key-off, for example). In another embodiment, the trip may be defined as a period of time, an entire day, and/or a rental period.

The system may recognize the one or more road segments as explained in operations 206 through 212. As shown in FIG. 7, the system may combine the road segments 308a, 308b, 308c, etc. when an end of trip is detected for the drive event 700. The system may calculate a smoothness factor for each road segment 308 of the trip.

In operation 226, the system may transmit the statistical comparison for the entire trip to the vehicle via the VCS communication link. The statistical comparison for the entire trip may provide a visual comparison of the smoothness factor of the driver compared to others who have driven on the one or more road segments 308. The statistical comparison for the entire trip may be displayed at a VCS user interface, a nomadic device user interface, and/or a combination thereof. The statistical comparison for the entire trip provides a trip performance graph as shown in FIGS. 8A and 8B.

Figure 8A:
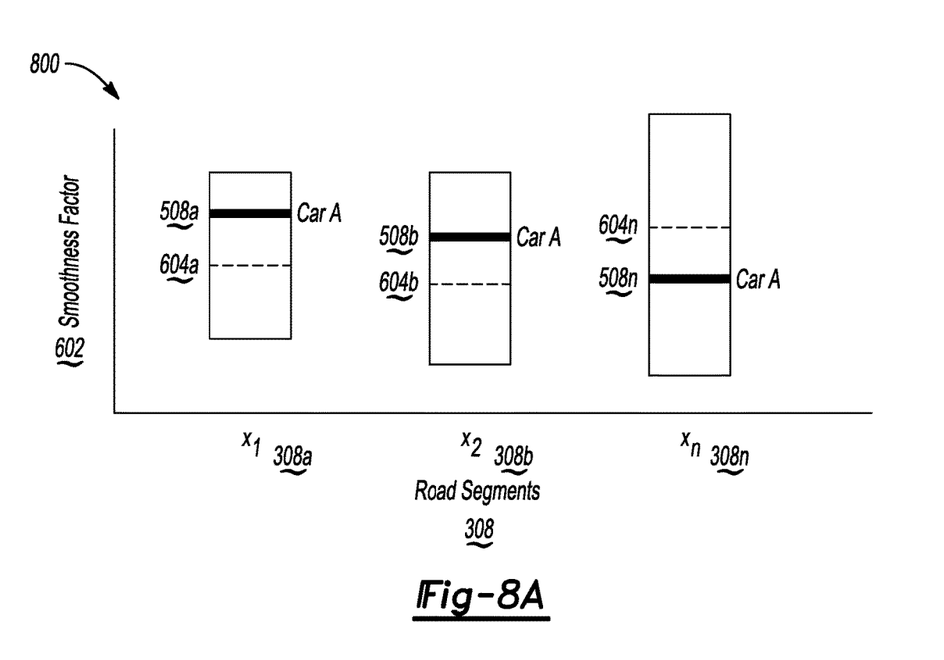
FIGS. 8A and 8B illustrate an exemplary graph for a trip score based on the trip performance.

FIG. 8A illustrates an exemplary graph 800 for a trip score based on the trip performance. The graph 800 includes an x-axis depicting the road segments 308 and a y-axis depicting a smoothness factor 602. The system may output the nominal smoothness factor 604 for each road segment 308 on the graph 800 as calculated in equation (3). The system may output the smoothness factor 508 on the graph 800 so that the driver can visually compare the smoothness factor 508 to the nominal smoothness factor or range of factors for that road segment 308.

For example, in response to the first road segment 308a of the trip, the graph 800 may output a nominal smoothness factor 604a and a smoothness factor 508a. In response to the second road segment 308b of the trip, the graph 800 may output a nominal smoothness factor 604b and a smoothness factor 508b. The system may continue to output a nominal smoothness factor 508n and a smoothness factor 604n for each additional road segment 308n of the trip.

Figure 8B:
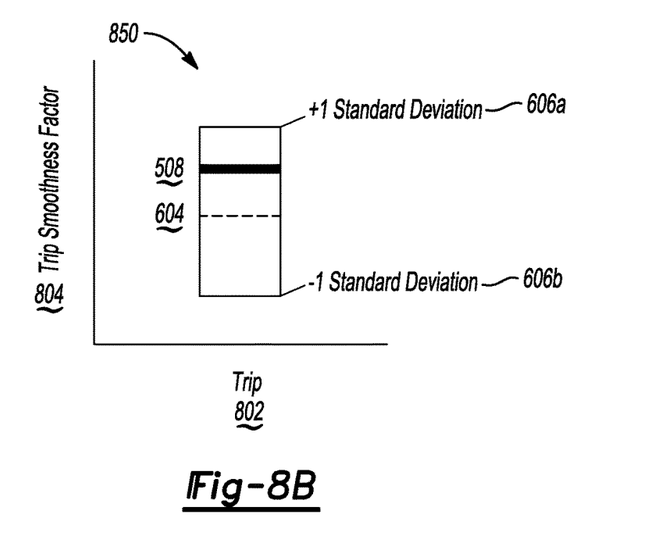

The system may combine all the road segments scores to get a full trip score as shown in FIG. 8B. The full trip score may be a graph 850 for the trip smoothness factor 508 of the vehicle compared to other vehicle data driven on the road segments of the trip. The graph 850 includes an x-axis depicting the trip 802 and a y-axis depicting a trip smoothness factor 804. The system may output the calculated standard deviation 606a, 606b of the smoothness factor for the trip. The system may output the driver's smoothness factor 508 for the trip on the graph 850 relative to a range of nominal values, such as one standard deviation 606a, 606b of the nominal smoothness factor 604 for the trip. Once the data has been transmitted to the VCS, the system may disable the communication link in operation 228.

Figure 9:
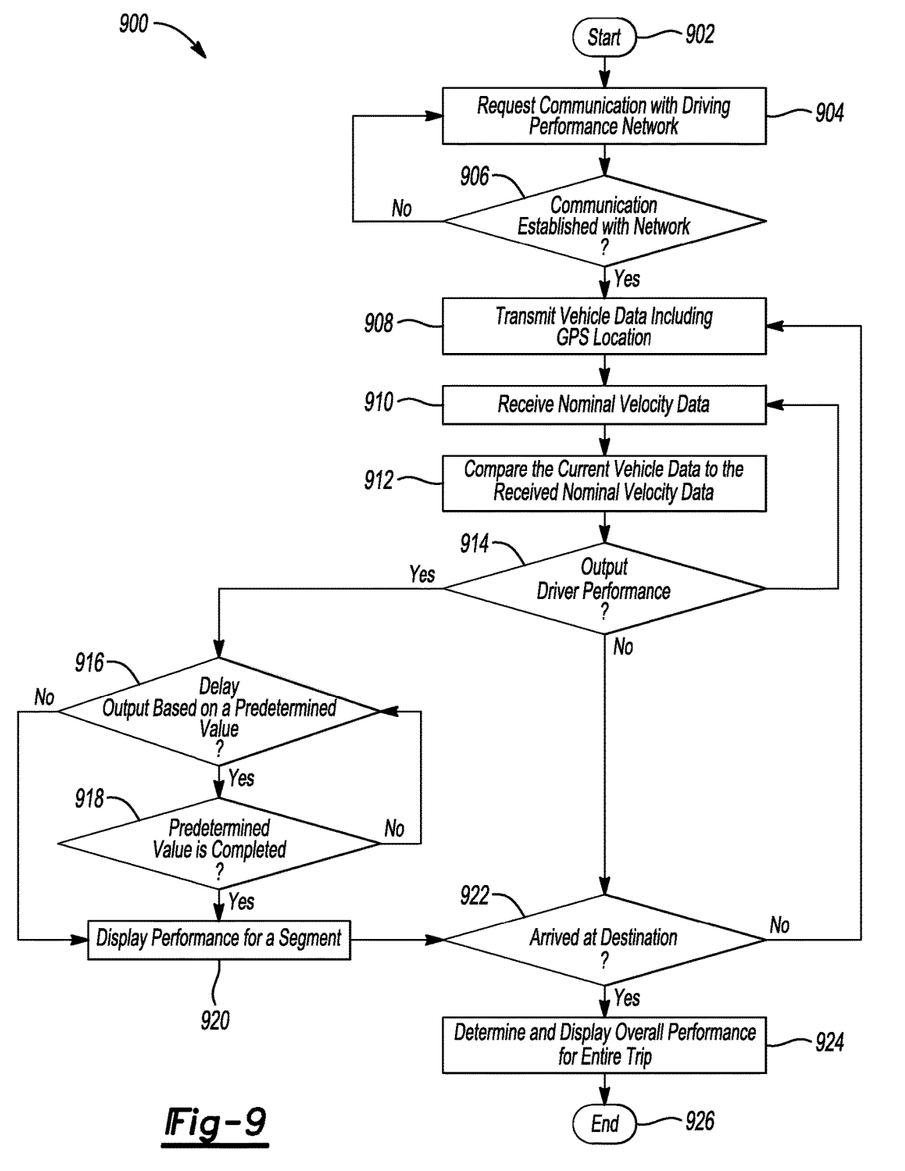
FIG. 9 is an exemplary process for the vehicle computing system communicating with the driving performance system.

FIG. 9 is an exemplary method 900 for the vehicle computing system 1 communicating with the driving performance system 61. The method 900 of calculating the smoothness factor for each road segment may be implemented through a computer algorithm, machine executable code, or software instructions programmed into a suitable programmable logic device(s) at the vehicle processor 3, at the server 61, at the nomadic device 53, or a combination thereof. Although the various operations shown in the flowchart diagram 900 appear to occur in a chronological sequence, at least some of the operations may occur in a different order, and some operations may be performed concurrently or not at all.

In operation 902, the smoothness factor method may be enabled based on one or more inputs including, but not limited to, a key-on event, a start request received at a user interface of the VCS, a smoothness factor predetermined timer, and/or a combination thereof. The VCS 1 may request communication with the driving performance system network 61 in operation 904.

In operation 906, the VCS 1 may verify a communication link is established with the network 61. For example, the VCS 1 may establish communication with the driver performance network 61 using a nomadic device paired with the VCS 1. In another example, the VCS 1 may have an embedded modem and/or embedded cellular phone to establish direct communication with the network 61.

In operation 908, once a communication link is established with the network 61, the VCS 1 may transmit vehicle data including the GPS location of the vehicle 31. The vehicle data may also include, but is not limited to, vehicle speed information, anti-lock brake system information, and engine performance parameters. In response to the vehicle data, the VCS 1 may receive a nominal velocity for the road segment 910. The VCS may compare the current vehicle data to the received nominal velocity data for the road segment in operation 912.

For example, the VCS 1 may calculate a smoothness factor for the road segment based on the vehicle data and received nominal value. The VCS 1 may compare the smoothness factor to the previous data of the road segment received with the nominal velocity data. As stated above, the driver performance system 61 may provide the calculations of the smoothness factor and determine the statistical comparison of the road segment based on the vehicle data. In another example, the method to calculate the smoothness factor may be performed at the VCS 1, at the driver performance system 61, and/or a combination thereof.

In operation 914, the VCS 1 may output driver performance feedback based on the smoothness factor of the road segment traveled. If the VCS 1 is configured to output driver performance of the road segment, the VCS 1 may determine if a delay to display the output is based on a predetermined value in operation 916.

For example, the VCS may be configured to delay the output based on a predetermined value, condition, parameter, flag, status indicator, etc. The predetermined value may be based on a vehicle speed, driver workload, and/or a combination thereof. In another example, the predetermined value may be set to display the output of the driver performance when the vehicle is in a PARK gear position.

In operation 918, the VCS 1 may verify that the predetermined value is satisfied before transmitting the driver performance to an output device. If the VCS 1 does not require a predetermined value to delay the output or the predetermined value is satisfied, the VCS 1 may display the performance for a road segment in operation 920. For example, the VCS 1 may output the driver performance to the display 4. In another example, the VCS 1 may transmit the driver performance to the paired nomadic device 53 so that the driver may review his/her performance once the trip is complete.

In operation 922, the VCS 1 may determine if the driver arrived at the destination. For example, the VCS 1 may receive destination information from the navigation system. In another example, the VCS 1 may determine that the driver arrived at the destination based on an ignition key-off request or similar indicator. If the driver did not arrive at the destination, the VCS 1 may continue to calculate the driver performance in operation 908 through 922.

In operation 924, the VCS 1 may determine and display an overall performance for the trip based on arriving at the destination. For example, the VCS 1 may receive the statistical comparison for the entire trip from the driver performance system 61 via the communication link. The statistical comparison for the entire trip may provide the driver of the vehicle a visual comparison of the smoothness factor compared to others who have driven on the one or more road segments in the trip. The statistical comparison for the entire trip may be displayed at a VCS 1 user interface, a nomadic device user interface, and/or a combination thereof. In response to a key-off event or similar indicator, the data may be stored in local memory or transmitted to the nomadic device. The VCS 1 may begin to power down the driver performance method based on the key-off event in operation 926.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A vehicle comprising:
   a vehicle computer programmed to:
     store vehicle speed data in a memory; and
     output a smoothness rating of the vehicle at a display, the smoothness rating generated based on integrating a difference between speed of the vehicle associated with a road segment and a nominal velocity profile of a plurality of vehicles that have driven on the road segment, divided by a distance of the road segment.

2. The vehicle of claim 1, wherein the smoothness rating is generated at a remote network having at least one computer in communication with the vehicle computer.

3. The vehicle of claim 1, wherein the computer is configured to communicate with a wireless transceiver to enable a communication link with a remote network having at least one computer programmed to calculate the nominal velocity profile of the road segment.

4. The vehicle of claim 3, wherein the at least one computer at the remote network is further programmed to calculate a standard deviation for the nominal velocity profile and compare the smoothness rating to the standard deviation.

5. The vehicle of claim 1, wherein the computer is further programmed to generate a trip based on one or more road segments, calculate a trip smoothness rating based on the smoothness rating for each of the one or more road segments, and wherein the output of the smoothness rating at the display is in response to an arrival at a destination for the trip.

6. The vehicle of claim 5, wherein the destination is based on at least one of navigation system information, a key-off request, and a signal indicating a transmission in PARK.

7. The vehicle of claim 1, wherein the output of the smoothness rating is delayed based on a predetermined value compared to at least one of vehicle speed and driver workload.

8. The vehicle of claim 1, wherein the display is a nomadic device user interface that is in communication with the computer via a wireless transceiver.

9. A method comprising:
   storing, in a database, driving speed data over a road segment for a plurality of vehicles;
   calculating a nominal speed profile for the road segment using the driving speed data; and
   displaying a driver smoothness rating based on integrating a difference between speed of the vehicle and nominal speed profile associated with the road segment, divided by a distance of the road segment.

10. The method of claim 9, further comprising summing a smoothness rating for a plurality of road segments to generate a smoothness rating associated with a trip.

11. The method of claim 9, further comprising displaying a smoothness rating for a user selectable previous driving distance.

12. The method of claim 9, further comprising displaying an instantaneous smoothness rating for a current driving segment.

13. The method of claim 9, further comprising providing a warning signal to a driver in response to a deviation from the nominal speed profile exceeding a predetermined threshold.

14. The method of claim 13, wherein the warning signal comprises at least one of an audible signal, light signal, steering wheel vibration, and pedal vibration.

15. The method of claim 9, further comprising providing a recommendation message to a driver based on improving the smoothness rating.

16. The method of claim 9, further comprising transmitting the smoothness rating to an external computer.

17. A driver performance server comprising:
   a processor configured to communicate with a vehicle computing system (VCS), the processor programmed to:
      in response to vehicle data including a location and vehicle speed received from the VCS:
         retrieve a road segment;
         calculate a nominal velocity for the road segment based on a plurality of vehicles that have driven on the road segment;
         calculate a smoothness rating based on integrating a difference between the nominal velocity and the vehicle speed for the road segment; and
         transmit the smoothness rating to the VCS.

18. The server of claim 17, wherein the processor is further programmed to generate a trip based on one or more road segments, calculate a trip smoothness rating based on the smoothness rating for each of the road segments for the one or more road segments, and in response to an arrival at a destination for the trip, output the trip smoothness rating.

19. The server of claim 17, wherein the processor is further programmed to calculate a standard deviation for the nominal velocity and compare the standard deviation for the nominal velocity to a standard deviation of the smoothness rating.

20. The server of claim 17, wherein the smoothness rating is configured for output as a graph comparing the smoothness rating to the nominal velocity of the road segment.

* * * * *